United States Patent Office 3,798,291
Patented Mar. 19, 1974

3,798,291
HALOGENATED POLYHYDROCARBONS HAVING A REGULAR STRUCTURE, AND PROCESS FOR OBTAINING SAME
Gino Dall'Asta, Milan, and Pietro Meneghini, Pioltello, Italy, assignors to Montecatini Edison S.p.A., Milan, Italy
No Drawing. Continuation of abandoned application Ser. No. 870,424, Oct. 21, 1969. This application Jan. 17, 1972, Ser. No. 218,556
Claims priority, application Italy, Oct. 21, 1968, 22,766/68
Int. Cl. C08f 5/00
U.S. Cl. 260—931          6 Claims

ABSTRACT OF THE DISCLOSURE

Linear, high molecular weight poly(dihalogenalkenamers) are disclosed. The polymers show the repeating unit —CHX—CHX(—CHR)$_n$— in which X is chlorine or bromine, R is hydrogen, methyl or phenyl, and $n$ is a whole number from 3 to 10. Some of the polymers are amorphous. Other of the polymers, those prepared from stereoregular polyalkenamers by the present process, appear to be crystalline when subjected to X-ray examination. All of these polymers are vulcanizable. The new polymers are prepared by reacting a polyalkenamer, the repeating unit of which is essentially —CH=CH—(—CHR)$_n$— in which R and $n$ have the significance mentioned above, in solution, with chlorine or bromine until the double bonds present in the starting polyalkenamer totally disappear.

---

This is a continuation of our application Ser. No. 870,424, filed Oct. 21, 1969, now abandoned.

THE PRIOR ART

The importance of halogenated polyhydrocarbons, such as, e.g., polyvinyl chloride, in the field of plastic materials, is well known.

Although it has many advantages, polyvinyl chloride has two considerable drawbacks: (1) its relatively high (around 70° C.) glass transition temperature (Tg), a property which makes its rather brittle and poorly resistant to impact (low resilience); and (2) its chemical instability, particularly at the high temperatures required to process it, and which is manifested by the loss of hydrochloric acid and yellowing of the polymer.

These drawbacks of polyvinyl chloride can be remedied only partly. For example, some improvement in the low resilience can be achieved by means of plasticizers compatible with polyvinyl chloride. Also, some improvement in the chemical stability under heating can be obtained by means of certain selected stabilizers, or by modifying the polymer chemically. However, such expedients are expensive and, in addition, do not always result in a sufficient or satisfactory improvement in the resilience and/or in the chemical stabilty.

A main reason for the above-mentioned drawbacks of polyvinyl chloride is that the polymer contains a high percentage of chlorine, usually about 57% of the polymer.

It has been proposed to avoid the high glass transition temperature and chemical instability under heating by using chlorinated polyethylene instead of polyvinyl chloride. The chlorinated polyethylene can be obtained by reacting chlorine with polyethylene, and its chlorine content can be adjusted easily by controlling the amount of chlorine caused to react with the polyethylene. However, the mechanical properties of the chlorinated polyethylenes are inferior to those of polyvinyl chloride and, therefore, the chlorinated polyethylenes are satisfactory and acceptable substitutes for polyvinyl chloride for only a few applications.

The inferior mechanical properties of the chlorinated polyethylenes, as compared with those of polyvinyl chloride, are due principally to the random distribution of the chlorine atoms along the polyethylene chains, and the substantial reduction in the D.P. (degree of polymerization) of the polyethylene in consequence of secondary reactions which occur during chlorination thereof and are accompanied by dehydrochlorination of the polymer.

THE PRESENT INVENTION

One object of this invention is to provide new, linear, halogenated polyhydrocarbons characterized by a regular chemical structure and a variable number of hydrocarbon groups positioned between two consecutive halogenated atoms in the polymeric chain.

Another object is to provide new, linear, halogenated polyhydrocarbons which, besides having the regular chemical structure, also have a regular steric structure which enables the polyhydrocarbons to crystallize.

An additional object of the invention is to provide a process for obtaining said halogenated polyhydrocarbons by the addition of a halogen to the olefinic double bonds of starting polyalkenamers.

A still further object of the invention is to provide new, linear halogenated polyhydrocarbons useful, more particularly, in the fields of plastic materials, plasticizers, and elastic rubbers.

Further objects of this invention will appear from the following, more detailed description of the invention and the working examples.

Our objectives are achieved by the present invention in accordance with which it is found, surprisingly, that it is possible to obtain chlorinated polyhydrocarbons having a structure similar to that of polyvinyl chloride (or, more generally speaking, of halogenated polyhydrocarbons) by a simple reaction resulting in the addition of a halogen to the olefinic double bonds of certain polyhydrocarbons which are polyalkenamers. The halogenated polyhydrocarbons have a regular chemical structure and a halogen content which can be adjusted and controlled, depending on the starting polyalkenamer.

The new polymers of the invention are linear, high molecular weight poly-(dihalogenalkenamers) in which the repeating monomeric unit is:

(I)          —CHX—CHX—(—CHR)$_n$— in which X is a chlorine or bromine atom, R is hydrogen, methyl or phenyl, and $n$ is a whole number from 3 to 10.

The polymers are characterized in having an intrinsic viscosity, in cyclohexanone at 30° C. which is comprised between 1 to 10 dl./g.; in being insoluble in carbon tetrachloride, even at the boiling point; in being insoluble at room temperature in aliphatic and cycloaliphatic hydrocarbons, in low-boiling alcohols, and in low-boiling ketones; and in being soluble in methylene chloride, chloroform, tetrahydrofuran and high-boiling ketones.

In Formula I, R is preferably hyrdrogen.

The units (I) are linked to a head-to-tail enchainment, in the polymer chains. The regular chemical structure of the polymers depends on the following factors:

(1) the polymeric chains are essentially linear and unbranched;
(2) each monomeric unit contains two halogen atoms linked to two adjacent tertiary carbon atoms;
(3) the —CHX— groups of each monomeric unit are separated from those of the adjacent monomeric unit by a certain number ($n$) of —CHR— hydrocarbon groups.

The regular steric structure which characterizes some of the polymers of this invention results from the fact that the two carbon atoms to which the halogen atoms are linked are asymmetric. When the steric configuration of the two asymmetric carbon atoms of the monomeric unit is the same, the steric configuration is termed "threo"; if the two asymmetric carbon atoms in the monomeric unit have opposite (different) steric configurations, the steric configuration is term "erythro."

The stereoregularity of some polymers according to the invention is characterized in that a given steric configuration of the two asymmetric carbon atoms of one monomeric unit is repeated in predominantly all of the units of the stereoregular chain portions. Such polymers are correctly described, therefore, as either poly-(1,2-threo-dihalogen-alkenamers) or poly-(1,2-erythro-dihalogen-alkenamers).

The presence of a high degree of stereoregularity in the polymeric chains imparts particular physical and mechanical properties to the polymers. For example, the stereoregular polymers generally appear to be crystalline on X-ray examination.

The polymers having stereoregular structure are generally less soluble in solvents for the non-stereoregular polymers, and have melting points which are higher than the melting points of the non-stereoregular polymers. Furthermore, the polymers having a stereoregular structure have excellent mechanical properties. The excellent physical and mechanical properties of these polymers are due to a combination of the stereoregularity, the halogen content of the polymers, and the type of halogen, i.e., whether it is chlorine or bromine.

Of two halogenated polyalkenamers according to the invention and one containing chlorine, the other bromine, the chlorinated polyalkenamer is chemically more stable under heating. The halogen being the same, the halogenated polyalkenamer having the lower halogen content, i.e., the one in which the number of $n$ units in Formula I is greater, has the greater chemical stability, under heating. A reduction in the glass transition temperature ($Tg$) of the halogenated polyalkenamers is observed with decrease in the halogen content, which not only improves the processability of the halogenated polymers, since the mechanical processing (molding, extrusion, etc.) does not require high temperatures, but also makes the halogenated polymers suitable for use as plasticizers (e.g., for polyvinyl chloride) and as elastomers which are curable by means of recipes shown herein.

When halogenated polyalkenamers according to this invention are vulcanizable elastomers, the chemical and steric regularity in the polymeric chains improves the elastic properties of the cured products, since the regularity facilitates a parallelly ordered arrangement and, in a given case, crystallization of the polymeric chains, on stretching of the chains in one direction.

The halogenated polyalkenamers obtained according to this invention by chlorination of polyalkenamers having the repeating unit (I) in which X is chlorine, R is hydrogen, and $n$ is 6 or more, are proved to be particularly suitable for use as plasticizers for polyvinyl chloride and as elastomers curable to an elastic rubber. The elastic rubber obtained by curing these chlorinated polyalkenamers with the aid of various recipes based on sulfur, accelerators, and metal oxides or metal oxide and peroxides, not only has good elastic properties, but is also resistant to hydrocarbon solvents which neither dissolve nor swell the rubber. This adapts the new synthetic rubber to use in applications requiring a rubber resistant to mineral oils.

As previously mentioned, the halogenated polyhydrocarbons of the invention are insoluble in carbon tetrachloride, even at the boiling point, and are generally soluble in other chlorinated solvents such as methylene chloride and chloroform, and in cyclic ethers such as tetrahydrofuran and high boiling ketones of the type of cyclohexanone.

The halogenated polyhydrocarbons have a high molecular weight, as indicated by the intrinsic viscosity which, in cyclohexanone at 30° C., is generally comprised between 1 and 10 dl./g.

Many of the halogenated polyhydrocarbons, when prepared from stereoregular polyalkenamers under conditions disclosed herein, appear to be crystalline on X-ray examination. Those polymers of the invention have particularly good physical and mechanical properties.

The new halogenated polyalkenamers are obtained by reacting the starting polyalkenamer, the monomeric unit of which is essentially (II) —CH=CH(—CHR)$_n$— in which R and $n$ have the same significance as in Formula I, and in which essentially all the monomeric units are linked together in a head-to-tail enchainment, in solution, for example in methylene chloride or an aromatic hydrocarbon solvent, with chlorine or bromine either undiluted or dissolved in the solvents mentioned, at temperatures in the range from —80° C. to +150° C., preferably from —30° C. to +40° C., the reaction being continued until the olefinic double bonds of the polyalkenamer have completely disappeared, as can be determined by examination of the infra-red spectrum.

The starting polyalkenamers can be obtained by processes described in U.S. Pats. Nos. 3,459,725 and 3,449,310 and in U.S. patent applications Ser. Nos. 787,622; 587,652/60 and 652,719/60; or by G. Natta, A. Zambelli, I. Pasquon and P. Ciampelli in their paper published in Makromolekulare Chemie, vol. 79, 161 (1964) or in Jr. Polymer Science, part A-1, vol. 5, pp. 2209–2217 (1967).

The starting polyalkenamers are either highly stereoregular, i.e., polyalkenamers in which the double bonds of substantially all of the monomeric units are of the cis type, or of the trans type; or are atactic polyalkenamers containing considerable quantities of both cis- and trans-internal double bonds.

Preferably, the starting polyalkenamers have a high molecular weight corresponding to an intrinsic viscosity, in cyclohexanone, higher than 0.5 dl./g.

The halogen added to the double bonds of the starting polyalkenamer is normally used in the elemental state, e.g., by bubbling a stream of chlorine into a solution of the polyalkenamer, or by adding a solution of the halogen, or the liquid halogen per se, dropwise to the solution of the polyalkenamer, with vigorous stirring of the latter.

In general, it is preferred to carry out the reaction of the halogen with the polyalkenamer, which results in the addition of the halogen to the double bonds of the polyalkenamer, at low temperature, in order to avoid undesired side reactions such as dehydro-halogenation.

However, it is not always possible to operate at a low temperature, because some of the polyalkenamers which can be used as starting polymer do not dissolve below a relatively high temperature in the solvents used. This is particularly true of the crystalline polyalkenamers in which $n$ is equal to, or higher than 6. In those instances, it is appropriate to operate at the lowest temperature at which the polyalkenamer is sufficiently soluble in the solvent used.

The solvent selected for use in the addition reaction is, preferably, methylene chloride. However, aromatic hydrocarbon solvents such as benzene can also be used. In these solvents, under the conditions disclosed herein, there occurs, normally, only an addition of halogen to the polyalkenamer according to the following scheme:

(III) 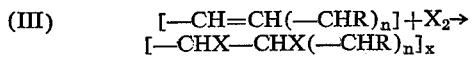

Under these conditions, no appreciable substitution reactions are observed.

It is well known that the addition of halogen to olefinic double bonds is often accompanied by dehydro-halogenation. In the present case, the secondary reaction is observed, generally, only when the addition reaction is carried out at excessively high temperatures and, more especially, when solvents such as carbon tetrachloride are used.

The addition reaction is generally carried out using the stoichiometric amount of halogen, or a slight excess of halogen of the order of 10 to 20%. The halogen is added to the solution of the polyalkenamer in a period of time of some tens of minutes and, the addition reaction being rather fast, it is often completed in a half hour. To insure certain saturation of all the double bonds of the polyalkenamer with halogen, it is preferred to maintain the solution of polyalkenamer and halogen in, e.g., methylene chloride, under strong stirring for 1 to 2 hours, at the reaction temperature. It has not been found necessary to catalyze the reaction with particular catalysts or by the action of light.

Preferably, the solution of the polyalkenamer in methylene chloride has a concentration of from 0.5% to 5.0%.

At the end of the reaction, the halogenated polymer is normally coagulated by pouring the reaction mixture into methanol. The halogenated polymer is separated and dried, the solvent being recovered by distillation. Before the polymer is hot-processed, it can be stabilized by incorporating in it a small quantity of a stabilizer, for example, of dibutyl tin mercaptyl.

Examples which follow show the use of halogenated polyalkenamers of the invention as plasticizers for polyvinyl chloride, curing of halogenated polyalkenamers of the invention with the aid of recipes based on sulfur, accelerators and metal oxides, as well as the physical and mechanical properties of such products suitable for use as a molding material. Those examples, like other examples provided, are given to illustrate the invention and are not intended to be limiting.

EXAMPLE 1

22 g. of polypentenamer (containing 99% of cis-pentenamer units and 1% of trans-pentenamer units, and having an intrinsic viscosity of 1.38 dl./g. in cyclohexanone at 30° C.) are dissolved in 1500 ml. methylene chloride in a 3-liter flask provided with a mechanical stirrer, a thermometer and an inlet for feeding the reactants. The solution is cooled down to —20° C. and 30 ml. of liquid chlorine dissolved in 250 ml. methylene chloride are added under stirring by means of a dropping funnel cooled down to —80° C. The chlorine solution is dropped into the flask in 15 minutes, stirring is carried on for 6 hours at —20° C., and thereafter the reaction is poured into methanol.

46 g. of a white, fibrous polymer are obtained, which is soluble in methylene chloride, tetrahydrofuran, cyclohexanone at 20° C. and in methyl ethyl ketone and chloroform at 50° C. The polymer is insoluble, even at the boiling point, in carbon tetrachloride, benzene and toluene.

The intrinsic viscosity in cyclohexanone at 30° C. is 5.0 dl./g. The infrared analysis shows the absence of unsaturation. The polymer appears to be crystalline on X-ray examination.

The main diffraction lines were found at the lattice distances of: 5.20 A.; 3.80 A.; 2.25 A.; the density is 1.4 g./cm.$^3$. The polymer essentially has the chemical structure of a poly(1,2-threo-dichloro-pentenamer). The mechanical properties of the polymer stabilized by incorporating 2% by weight of dibutyl tin mercaptyl therein, are as follows:

Yield point: 490 kg./cm.$^2$
Elongation at yield: 8%
Tensile strength: 600 kg./cm.$^2$
Elongation at break: 200%
Vicat point (5 kg.): 42° C.
Rockwell hardness (Scale R): 100
Flexural modulus: 28,500 kg./cm.$^2$
Impact resistance (Izod method): 4.5 kg. x cm./cm.

In order to permit a comparison, the corresponding mechanical properties of rigid (non-plastified) PVC were determined. These are:

Yield point: 530 kg./cm.$^2$
Elongation at yield: 8%
Tensile strength: 500 kg./cm.$^2$
Elongation at break: 150%
Vicat point (5 kg.): 78° C.
Rockwell hardness (Scale R): 100
Flexural modulus: 31,500 kg./cm.$^2$
Impact resistance (Izod method): 2.3 kg. x cm./cm.

As is apparent, the mechanical properties of the chlorinated polypentenamer are very similar to those of a polyvinyl chloride, but the glass transition temperature is much lower (cfr. Vicat point 42° C. instead of 78° C. for PVC) and, consequently, the resilience (Izod impact resistance=measure of brittleness) is considerably improved (4.5 instead of 2.3 kg. x cm./cm.).

EXAMPLE 2

1.4 g. of the same cis-polypentenamer as in Example 1 are dissolved in 500 ml. methylene chloride according to the same modalities as in Example 1. 5 ml. of liquid chlorine dissolved in 200 ml. of methylene chloride are added.

The reaction is carried on at —30° C. for 15 hours.

8.1 g. of a white, fibrous polymer are obtained. It is soluble at 20° C., in methylene chloride, tetrahydrofuran and cyclohexanone, and insoluble, even at the boiling point, in carbon tetrachloride and aromatic solvents.

The intrinsic viscosity in cyclohexanone at 30° C. is 4.28 dl./g. The chlorine content amounts to 49.2%. The density is 1.40 g./cm.$^3$. The glass transition temperature ($Tg$) is 19° C. When subjected to X-ray examination, the polymer appears to be crystalline and shows the same main diffraction lines as the sample of Example 1, and the same structure.

EXAMPLE 3

Using the process as described in Example 1, 4 g. of the same cis-polypentenamer as in Example 1 are dissolved in 250 ml. of methylene chloride.

5 ml. liquid chlorine dissolved in 20 ml. methylene chloride are added and allowed to react under stirring at —20° C. for 30 minutes. Thereafter the polymer is coagulated in methanol.

8.1 g. of a white, fibrous polymer having the same solubility characteristics as that of Example 2 are obtained.

The intrinsic viscosity in cyclohexanone at 30° C. is 4.83 dl./g. The chlorine content amounts to 49.5%. The density is 1.39 g./cm.$^3$. When subjected to X-ray examination, the polymer appeared to be crystalline and presented the same main diffraction lines as the sample of Example 1, and the same structure.

EXAMPLE 4

29 g. polypentenamer (containing 85% of trans-pentenamer units, and 15% of cis-pentenamer units and having an intrinsic viscosity of 1.05 dl./g. in cyclohexanone at 30° C.) are dissolved in 3 liters of methylene chloride in a 3 liter flask provided with a mechanical stirrer, a thermometer and an inlet for feeding the reactants.

The solution is cooled down to −20° C. and 29 ml. liquid chlorine dissolved in 250 ml. methylene chloride are added by means of a dropping funnel.

The mixture is allowed to react under stirring at a constant temperature of −20° C. for two hours. Thereafter, the resulting polymer is coagulated in methanol.

54 g. of white, fibrous polymer are obtained, which is soluble, at 20° C., in chloroform, methylene chloride, benzene, toluene, tetrahydrofuran and cyclohexanone, and insoluble, even at the boiling point, in carbon tetrachloride, Tetralin and Decalin. The intrinsic viscosity in cyclohexanone at 30° C. is 2.1 dl./g. The IR analysis confirmed the absence of unsaturation. The chlorine content amounts to 49.96%. The density is 1.4 g./cm.$^3$. The glass transition temperature (Tg) is 11° C. When subjected to X-ray examination, the polymer appeared to be crystalline. The main diffraction lines are at the lattice distances of: 5.37; 3.70; 3.30 A. The polymer prevailingly has the structure of a poly(1,2-erythro-dichloro-pentenamer).

The mechanical properties of the polymer stabilized by incorporating into it 2% by weight of dibutyl tin mercaptyl were as follows:

Tensile strength: 365 kg./cm.2
Elongation at break: 380%.

EXAMPLE 5

The reaction is conducted as in Example 1, using the following reactants:

5 g. of cis-polypentenamer as in Example 1, 200 ml. of methylene chloride, and 75 ml. of a 20% solution of bromine in methylene chloride.

The reaction is carried out for one hour at 20° C.

16.1 g. of a white, fibrous polymer, which is soluble, at 20° C. in chloroform, methylene chloride, tetrahydrofuran and cyclohexanone, insoluble, even at the boiling point, in carbon tetrachloride, benzene and toluene, are obtained.

The intrinsic viscosity in cyclohexanone at 30° C. is 1.91 dl./g. The bromine content amounts to 68.7%. The density is 1.89 g./cm.$^3$. The polymer appears to be crystalline on X-ray examination. It has essentially the structure of a poly(1,2-threo-dibromopentenamer).

EXAMPLE 6

The reaction is carried out as in Example 1, using the following reactants:

3 g. of the same trans-polypentenamer as in Example 4, 250 ml. methylene chloride, and 40 ml. of a 20% solution of bromine in methylene chloride. Halogenation is carried out at 25° C. under stirring for half an hour an hour.

8.3 g. of a white, fibrous product having the same solubility charactersitics as that of Example 5 are obtained. The intrinsic viscosity in cyclohexanone at 30° C. is 1.87 dl./g. The bromine content amounts to 68.8%. The density is 1.62 g./cm.$^3$. X-ray examination: the polymer appears to be crystalline. The main diffraction lines are situated at the lattice distances of 5.26; 4.20; 3.56; 3.16; 2.28 A. The polymer has prevailingly the structure of a poly(1,2,-erythro-dibromo-pentenamer).

EXAMPLE 7

The reaction is carried out as in Example 1, using the following reactants:

10 g. polyoctenamer consisting of 45% trans-octenamer units and 55% cis-octenamer units and having an intrinsic viscosity of 0.5 dl./g. in cyclohexanone at 30° C., 800 ml. methylene chloride, and
8 ml. liquid chlorine, technical grade.

The reaction is carried on for 15 minutes at 0° C. and the polymer is coagulated in methanol.

14 g. of a white, elastic product having a chlorine content of 39.4% are obtained. The polymer is soluble at 20° C. in chloroform, methylene chloride, tetrahydrofuran and cyclohexanone, and insoluble, even at the boiling point, in carbon tetrachloride and aromatic solvents. It is atactic. The density is 1.27 g./cm.$^3$. The intrinsic viscosity in cyclohexanone at 30° C. is 1.69 dl./g. Its glass transition temperature (Tg)=−20° C. The product has the structure of a poly (1,2-dichloro-octenamer).

EXAMPLE 8

The chlorinated polyoctenamer was used as an efficient plasticizer for polyvinyl chloride, and markedly improved the resilience of the PVC. A mixture of 17.5 parts by weight of the chlorinated polyoctenamer prepared according to Example 7, and 82.5 parts by weight of polyvinyl chloride was prepared by mechanical mixing on a roll mixer.

The Izod resilience (with notch, ASTM D256–56) of this mixture is 92±1 kg. x cm./cm. (against a value of 3.2 kg. x cm./cm. for the same unmodified polyvinyl chloride). The hardness (Rockwell method, R scale, ASTM D785/65) is 90 (unmodified polyvinyl chloride =100).

EXAMPLE 9

Description of the curing of a chlorinated polyoctenamer and of the elastic and mechanical properties of the cured product.

| Curing composition: | Parts by weight |
|---|---|
| Chlorinated polyoctenamer prepared according to Example 7 | 100 |
| Stearic acid | 0.5 |
| Magnesium oxide | 5 |
| Zinc oxide | 5 |
| Carbon black—HAF type | 50 |
| Mercaptobenzothiazol | 0.75 |
| Tetramethylthiouramdisulfide | 1.5 |
| Sulfur | 2.0 |

Curing at 160° C. for 30 minutes.

Characteristics of the cured product were as follows:

| | | |
|---|---|---|
| Tensile strength | kg./cm.$^2$ | 200 |
| Elongation at break | percent | 333 |
| Modulus at 200% | kg./cm.$^2$ | 152 |
| Residual deformation (after 1 min.) after 200% elongation for 1 hour | percent | 5.5 |

EXAMPLE 10

Operating as in Example 1, 2 g. of polyoctenamer as in Example 7 are dissolved in 250 ml. methylene chloride and 20 ml. of a 20% solution of bromine in methylene chloride are added. The solution is allowed to react for 1 hour at 10° C. 4.7 g. of a white, fibrous polymer are obtained which is soluble at 20° C. in chloroform and methylene chloride. Said polymer is atactic. The bromine content amounts to 59.3%. The density is 1.65 g./cm.$^3$.

EXAMPLE 11

The reaction is carried out as in Example 1, using the following reactants:

9 g. polydodecenamer (consisting of 79% trans-dodecenamer units and 21% cis-dodecenamer units), which is insoluble in cyclohexanone,
1500 ml. methylene chloride, and
4-ml. liquid chlorine dissolved in 100 ml. methylene chloride.

The reaction is carried on for 15 minutes at 40° C. and the polymer is coagulated in methanol.

11.5 g. of a product are obtained, which is soluble at 20° C. in methylene chloride and cyclohexanone, and insoluble, even at the boiling point, in carbon tetrachloride. The chlorine content is 33.6%. The glass transition temperature (Tg) is −32° C. The polymer appears to be crystalline on X-ray examination. The main diffraction lines correspond to lattice distances of 4.76 A. and 4.00 A. It prevailingly has the structure of a poly (1,2-erythro-dichloro-dodecenamer). The polymer thus obtained was mixed (as described in Example 8) with polyvinyl chloride and imparted to the latter an improved resilience.

EXAMPLE 12

Operating as in Example 1, 2 g. of polydodecenamer as in Example II are dissolved in 250 ml. benzene and 14 ml. of a 20% solution of bromine in methylene chloride are added. The solution is allowed to react for half an hour at 55° C. During the halogenation, the product becomes insoluble.

3.7 g. of a brown, sticky and semi-solid product are obtained, which appears to be amorphous on X-ray examination and has a bromine content of 49.6% and a density of 1.51 g./cm.$^3$. Its structure prevailingly is that of a poly (1,2-dibromododecenamer).

EXAMPLE 13

Operating as in Example 1, 7.5 g. of poly (3 methyl-octenamer) containing 55% trans units and 45% cis units and having an inherent viscosity of 1.4 dl./g. in benzene at 30° C. are dissolved in 500 ml. methylene chloride. 4 ml. liquid chlorine, technical grade, dissolved in 50 ml. methylene chloride are added and the solution is allowed to react for 30 minutes at 25° C. 10.2 g. of a white, solid polymer are obtained; it is soluble in methylene chloride and cyclohexanone, and insoluble in methanol and acetone. The chlorine content is 35.8% and the intrinsic viscosity in cyclohexanone at 30% C. is 1.6 dl./g. The density at 20° C. is 1.19 g./cm.$^3$. The product appears to be amorphous at X-ray examination. Its structure is that of a poly (1,2-dichloro, 3-methyl-octenamer).

EXAMPLE 14

Operating as in Example 1, 6.3 g. poly (3-phenyl-octenamer) containing 48% trans units and 52% cis units and having an inherent viscosity of 1.5 dl./g. in benzene at 30° C., are dissolved in 1000 ml. methylene chloride. 1.5 ml. liquid chlorine, technical grade, dissolved in 50 ml. methylene chloride are added, while keeping the reaction flask in the dark. The reaction is carried on for 60 minutes at 0° C.

6.8 g. of a white, solid polymer are obtained. It is soluble in methylene chloride at the boiling point, and insoluble in methanol and acetone. The chlorine content is 27.2% and the intrinsic viscosity in cyclohexanone at 30° C. is 1.5 dl./g. The product appears to be amorphous on X-ray examination. Its structure is that of a poly (1,2-dichloro, 3-phenyl-octenamer).

EXAMPLE 15

Operating as in Example 7, a polyoctenamer, containing 40% of cis and 60% of trans double bonds, was chlorinated yielding a polymer having the following characteristics:

Soluble at 20° C. in chloroform, methylene chloride, tetrahydrofuran, benzene and cyclohexanone;
Insoluble in carbon tetrachloride, methanol, acetone, even at the boiling temperatures;
Chlorine content=38.6%;
[η] in cyclohexanone at 30° C.=2.8 dl./g.;
Tg=−17° C.
Density=1.25 g./cm.$^3$ The polymer was vulcanized using the following recipe:

| | Parts by weight |
|---|---|
| Chlorinated polyoctenamer | 100 |
| FEF carbon black | 50 |
| Stearic acid | 0.5 |
| ZnO | 5 |
| MgO | 5 |
| Mercaptoimidazoline | 1 |
| Diphenylguanidine | 1 |
| Tetramethylthiourammonosulfide | 1 |
| Sulfur | 0.5 |

Curing at 160° C. for 60 minutes.

Characteristics of the cured product:

| | | |
|---|---|---|
| Tensile strength | kg./cm.$^2$ | 230 |
| Elongation at break | percent | 380 |
| Modulus at 200% | kg./cm.$^2$ | 160 |

EXAMPLE 16

Using the chlorinated polydodecenamer described in Example 11, vulcanization was carried out using the following recipe:

| | Parts by weight |
|---|---|
| Chlorinated polydodecenamer | 100 |
| HAF carbon black | 50 |
| ZnO | 20 |
| Sulfur | 0.32 |
| 1,1-di-tert.butylperoxy-3,3,5 - trimethyl-cyclohexane (at 40%) | 6 |

Curing at 150° C. for 20 minutes.

Characteristics of the vulcanized product:

| | | |
|---|---|---|
| Tensile strength | kg./cm.$^2$ | 144 |
| Elongation at break | percent | 500 |
| Modulus at 200% | kg./cm.$^2$ | 55 |

As will be apparent, changes and variations can be made in practicing the invention, without departing from the spirit thereof. Therefore, it is intended to include in the scope of the appended claims all such modifications as will be obvious to those skilled in the art from the description and working examples given herein.

What is claimed is:

1. Linear, high molecular weight poly (1,2-dichloro-dodecenamer) characterized in being insoluble, even at the boiling point, in carbon tetrachloride; in being insoluble at room temperature in aliphatic and cycloaliphatic hydrocarbons, in low-boiling alcohols, and in low-boiling ketones; and in being soluble in methylene chloride, chloroform, tetrahydrofuran and high boiling ketones, said poly (1,2-dichloro-dodecenamer) being obtained by chlorination of the double bonds of a starting polydodecenamer in which essentially all of the monomeric units are linked together in a head-to-tail enchainment, and said poly (1,2-dichloro-dodecenamer) being free of double bonds as determined by infra-red examination and showing no characteristics associated with the occurrence of dehydrohalogenation during the chlorination of the starting polydodecenamer.

2. A poly (1,2-dichloro-dodecenamer) according to claim 1, further characterized in that it exhibits crystallinity when subjected to X-ray examination.

3. Poly (1,2-erythro-dichloro-dodecenamer) according to claim 2, characterized in that the glass transition temperature thereof is about −30° C. to −35° C. and in that the main diffraction lines in the X-ray spectrum thereof correspond to lattice distances of 4.76 A. and 4.0 A.

4. The process for producing linear, high molecular weight poly (1,2-dichloro-dodecenamers) according to claim 1, which process consists in adding chlorine to a solution of a starting polydodecenamer in methylene chloride or benzene, at a temperature of from −80° C. to +150° C., and continuing the addition of the chlorine until all double bonds in the starting polydodecenamer disappear, as shown by examination of the infra-red spectrum of the poly (1,2-dichloro-dodecenamer).

5. The process of claim 4 in which chlorine is added to the solution of the starting polydodecenamer at a temperature in the range of —30° C. to +40° C.

6. The process of claim 4, in which chlorine is bubbled through the solution of the starting polydodecenamer.

References Cited
UNITED STATES PATENTS

| | | | |
|---|---|---|---|
| 2,980,656 | 4/1961 | Jones et al. | 260—85.1 |
| 3,293,226 | 12/1966 | De Schrijver | 260—85.1 |
| 3,392,161 | 7/1968 | Velz Mann | 260—94.7 |
| 3,449,310 | 6/1969 | Dall'Asta et al. | 260—93.1 |
| 3,458,489 | 7/1969 | Natta et al. | 260—93.1 |
| 3,464,966 | 9/1969 | Watson | 260—94.7 |
| 3,577,400 | 5/1971 | Judy | 260—88.2 |

STANFORD M. LEVIN, Primary Examiner

U.S. Cl. X.R.

260—23 XA, 32.8 R, 33.8 UA, 45.75 K, 899

UNITED STATES PATENT OFFICE
CERTIFICATE OF CORRECTION

Patent No. 3,798,291     Dated March 19, 1974

Inventor(s) Gino DALL'ASTA et al

It is certified that error appears in the above-identified patent and that said Letters Patent are hereby corrected as shown below:

Col. 3, line 24, " term " should be - - - termed - - -.

Col. 4, line 4, before " and " the word " oxide " should be - - - oxides - - -.

Col. 7, Example 4, line 5, " 3 liter flask " should be - - - 6 liter flask - - -.

Example 4, line 2 from below, " 365 kg./cm.2 " should be - - - 365 kg./cm.$^2$ - - -.

Example 6, lines 6 and 7, the repeated words " an hour " should be deleted;

Example 6, line 9, " characterteristics " should be - - - characteristics - - -.

Example 6, line 12, " 1.62 g./cm.$^3$ " should be - - - 1.82 g./cm.$^3$ - - -.

Example 6, line 14, " 5.26 " should be - - - 5.25 - - -.

Col. 9, Example 13, line 11, " 30% C. " should be - - - 30°C - - -.

Col. 9, Example 14, line 1, " 6.3 " should be - - - 5.3 - - -.

Signed and sealed this 29th day of April 1975.

(SEAL)
Attest:

RUTH C. MASON
Attesting Officer

C. MARSHALL DANN
Commissioner of Patents
and Trademarks